United States Patent [19]

Odom, Jr. et al.

[11] Patent Number: 4,582,251

[45] Date of Patent: Apr. 15, 1986

[54] SPACE THERMOSTAT FOR THE SIGHT HANDICAPPED

[75] Inventors: James A. Odom, Jr., Apple Valley; N. Thomas Wolfe, Minnetonka, both of Minn.

[73] Assignee: Honeywell Inc., Minneapolis, Minn.

[21] Appl. No.: 665,606

[22] Filed: Oct. 29, 1984

[51] Int. Cl.⁴ ............... G01D 13/22; G09B 21/00; G05D 23/00

[52] U.S. Cl. ............... 236/94; 116/205; 337/360; 434/113

[58] Field of Search ............ 236/94; 337/323, 360; 165/11 R; 434/113; 116/205, DIG. 47

[56] References Cited

U.S. PATENT DOCUMENTS

D. 176,657   1/1950   Dreyfuss .
2,091,146   8/1937   Hamilton .................. 434/113 X
2,522,423   9/1950   Youhouse ................. 116/205 X
2,543,389   2/1951   Van Lennep .............. 116/205
2,729,719   1/1956   Kronmiller ............... 200/138
3,536,017  10/1970   Lucas ..................... 434/113 X

*Primary Examiner*—William E. Wayner
*Attorney, Agent, or Firm*—Clyde C. Blinn

[57] ABSTRACT

A space thermostat for the sight handicapped has a raised pointer on the center control point adjustment means which cooperates with raised numbers representing temperature on a cover ring surrounding the control point adjustment means whereby a sight handicapped person can place a finger on the raised pointer and move the control point adjustment means by feeling the raised number to the desired temperature setting for the desired temperature in the space.

3 Claims, 2 Drawing Figures

SPACE THERMOSTAT FOR THE SIGHT HANDICAPPED

BACKGROUND AND SUMMARY OF THE INVENTION

While a thermostat such as shown in the Henry Dreyfuss U.S. Pat. No. 176,657, issued Jan. 17, 1956, has been on the market for many years, there has been a constant effort to make the thermostat easier for the sight handicapped to use. The main modification has been in the size of the indicia which is more readily seen by the homeowner.

The present invention recognizes that sight handicapped persons more readily can use their fingers to feel the position of the control point adjustment knob and the indicia or numbers for setting the thermostat.

DESCRIPTION OF THE INVENTION

Figure 1:
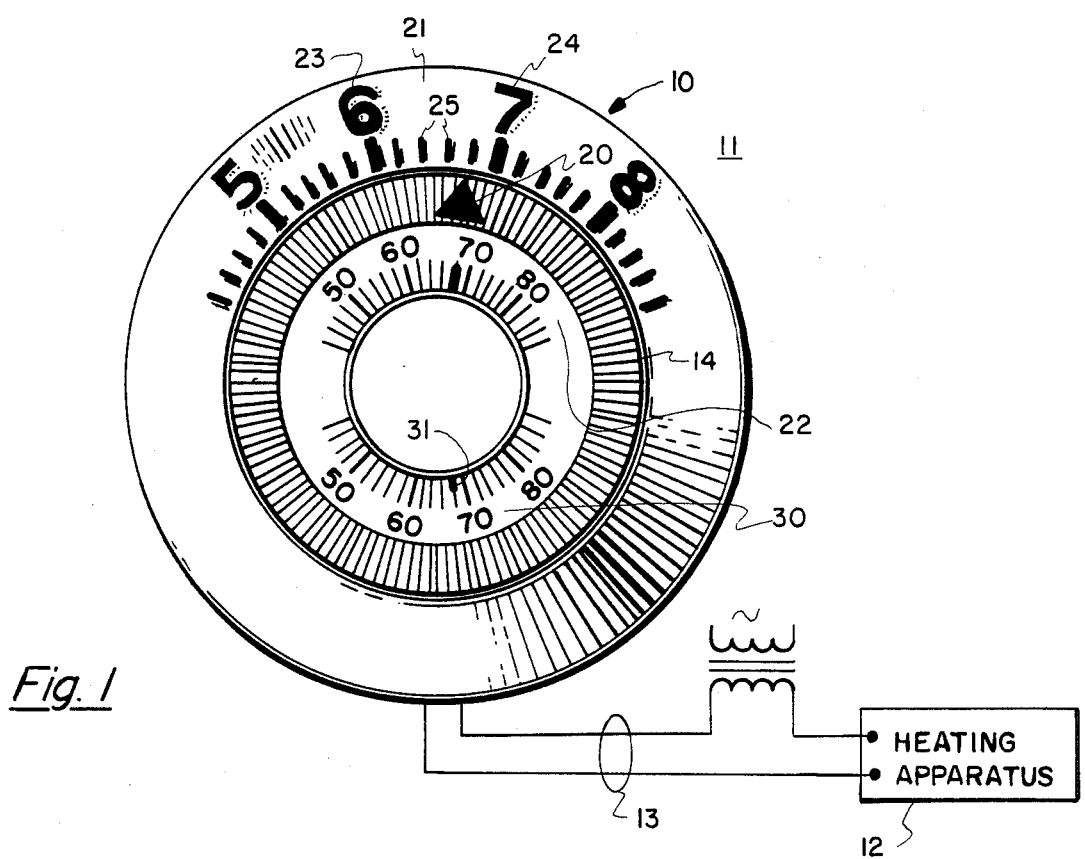
FIG. 1 is a front view of a thermostat shown for connection to heating apparatus.
Figure 2:
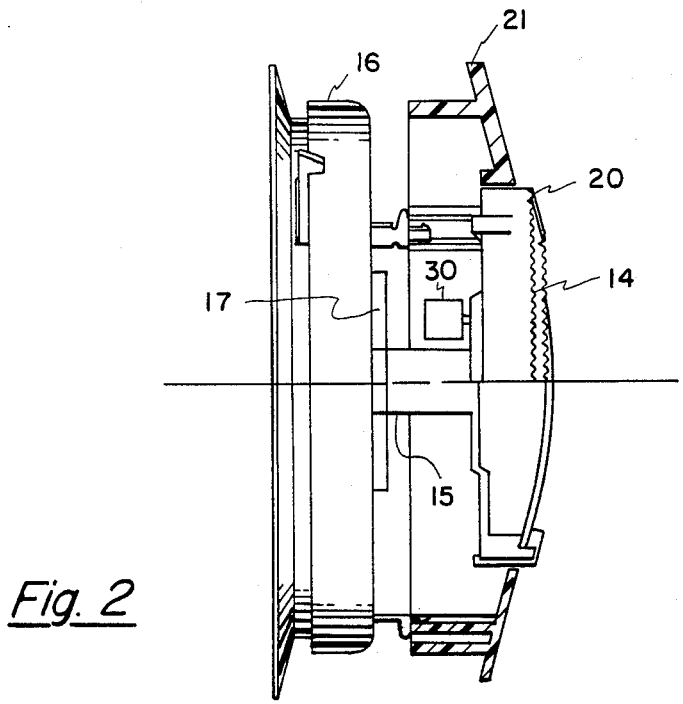
FIG. 2 is a cross-sectional side view of the thermostat of FIG. 1.

A thermostat 10 controls the temperature in a space 11 when connected to a temperature conditioning or heating apparatus 12 through a control circuit 13. Thermostat 10 is similar and operates the same as the thermostat disclosed in the Carl G. Kronmiller U.S. Pat. No. 2,729,719, issued Jan. 3, 1956. A center adjustment knob or means 14 is pivoted at 15 about a base member 16 as shown in FIG. 2 to position the conventional temperature control mechanism 17 depending upon the position of knob 14. A raised indication or pointer means 20 attached to the outer periphery of knob 14 is used to set the control point or temperature of the thermostat by positioning pointer 20 with respect to the temperature indicia of the temperature scale on an indicia support means or cover ring 21. Cover ring 21 is mounted on base 16 and surrounds knob 14. The scale on cover ring 21 is made of raised numbers, such as 23, 24 and others, spaced about the cover ring to coincide with a scale 22 in the center portion of knob 14.

In between the raised numbers 23, 24 and others are raised marks 25 which coincide with a two degree change in temperature control point. Both pointer means 20 and numbers 23, 24 and others as well as marks 25 could be at a different elevation to be felt by a sight handicapped person.

A second scale 30 provides a temperature indicating apparatus wherein a pointer 31, which is attached to a bimetal (not shown), indicates the temperature of space 11.

OPERATION OF THE INVENTION

When thermostat 10 is mounted on a wall of space 11, the temperature to be maintained in space 11 by heating apparatus 12 is controlled to the control point or temperature setting of the thermostat. A sight handicapped person can adjust knob 14 to change the control point temperature of the thermostat and thus the temperature maintained in the space 11. By feeling raised pointer 20 and positioning the pointer and knob to coincide with the raised number such as number 7 indicated at 24 to coincide with the temperature 70, the thermostat is set. The numbers 23 and 24, and others, are large enough and raised sufficiently that the sight handicapped can feel the numbers and know the temperature of the scale on cover ring 21.

In between the numbers 23 and 24, and others, are raised marks 25 which would indicate two degrees settings between the numbers 23 and 24. The sight handicapped could feel the raised portions and move the control point knob 14 and thus position the pointer at two degree increments of temperature from the numbered temperatures.

By means of a conventional spring loaded detent means 30 a positioning action of knob 14 provides a tactile step movement as well as an audible signal. The audible signal or click is generated for each of the movements between marks 25. The sight handicapped can not only feel numbers 23 and 24 and marks 25 to determine where to position pointer 20, but, by movement of knob 14, feel the two degree step movements and hear the clicks as the pointer moves from one mark to another between the adjacent numbers.

The embodiments of the invention in which an exclusive property or right is claimed are defined as follows:

1. A space thermostat for the sight handicapped comprising a base member adapted to be mounted on a wall of a space, temperature responsive control means mounted on said base member adapted to control temperature conditioning apparatus supplying temperature conditioned medium to a space, temperature control point adjusting means attached to said base member and connected to said temperature responsive control means for adjusting the temperature to be maintained in the space, said adjusting means having a raised control temperature reference portion, indicia support means attached to said base member and cooperating with said reference portion, raised indicia means on said indicia support means corresponding with temperature whereby a person with sight handicap can feel said reference portion and said indicia means to position said reference portion to the desired temperature control set point, said indicia support means comprises a cover ring mounted on said base member and surrounding said adjusting means, and raised indication marks on said cover ring between raised reference temperature numbers, said marks corresponding to two temperature degree steps in the movement of said adjusting means.

2. The invention of claim 1 comprising detent means connected to said control point adjusting means to provide a tactile step movement of said adjusting means to provide an audible signal each time said adjusting means moves said raised portion between predetermined temperature marks of said indicia means.

3. A space thermostat for the sight handicapped comprising, a base member adapted to be mounted on a wall of a space, temperature responsive control means mounted on said base member, said control means adapted to control temperature conditioning apparatus for supplying temperature conditioned medium to the space, temperature control point adjusting means attached to said base member and connected to said control means for changing the control temperature thereof, said adjusting means having a raised pointer, the position of said pointer can be felt by a sight handicapped person, and a circular temperature scale mounted on said base and associated with said adjusting means and pointer, said scale comprising large raised numbers coinciding with temperature values which can be felt by a sight handicapped person so said pointer can be positioned to select the desired temperature to adjust said temperature control means to maintain the selected temperature in the space.

* * * * *